United States Patent
Bissessur et al.

(10) Patent No.: US 6,801,963 B2
(45) Date of Patent: Oct. 5, 2004

(54) METHOD, SYSTEM, AND PROGRAM FOR CONFIGURING COMPONENTS ON A BUS FOR INPUT/OUTPUT OPERATIONS

(75) Inventors: Sailesh Bissessur, Phoenix, AZ (US); Mark A. Schmisseur, Phoenix, AZ (US); David R. Smith, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 42 days.

(21) Appl. No.: 10/205,544

(22) Filed: Jul. 24, 2002

(65) Prior Publication Data

US 2004/0019713 A1 Jan. 29, 2004

(51) Int. Cl.$^7$ .............................................. G06F 13/00
(52) U.S. Cl. ........................................ 710/33; 710/35
(58) Field of Search .............................. 710/33–35, 29, 710/52, 56

(56) References Cited

U.S. PATENT DOCUMENTS

| | | | |
|---|---|---|---|
| 5,522,054 A | * 5/1996 | Gunlock et al. | 711/112 |
| 5,854,894 A | * 12/1998 | Lancaster et al. | 709/219 |
| 6,070,207 A | 5/2000 | Bell | |
| 6,209,042 B1 | 3/2001 | Yanagisawa et al. | |
| 6,275,876 B1 | 8/2001 | Valk et al. | |
| 6,425,024 B1 | * 7/2002 | Kelley et al. | 710/56 |

FOREIGN PATENT DOCUMENTS

EP   0 653 711   5/1995

OTHER PUBLICATIONS

International Search Report, Annex to PCT invitation to pay additional fees (Form PCT/ISA/206), Jan. 9, 2004, for International Application No. PCT/US 03/22941.
PCI Special Interest Group, "PCI–X Addendum to the PCI Local Bus Specification", *PCI Local Bus*, Revision 1.0a, Jul. 24, 2000, pp. 1–113.
PCI Special Interest Group, "PCI Local Bus Specification", *PCI Local Bus*, Revision 2.3, Mar. 29, 2002, pp. i–xiv, & 1–112.
PCT International Search Report, Jan. 13, 2004, for International Application No. PCT/US 03/22667.
U.S. patent application Serial No. 10/205,662, filed Jul. 24, 2002, entitled "Method, System, and Program for Returning Data to Read Requests Received Over a Bus", invented by S. Bissessur, M. A. Schmisseur, & D. R. Smith.
U.S. patent application Serial No. 10/205,663, filed Jul. 24, 2002, entitled "Method, System, and Program for Handling Input/Output Commands", invented by S. Bissessur, R. P. Mackey, M. A. Schmisseur, & D. R. Smith.

* cited by examiner

*Primary Examiner*—Fritz Fleming
(74) *Attorney, Agent, or Firm*—David W. Victor; Konrad Raynes & Victor, LLP

(57) ABSTRACT

Provided are a method, system, and program that configures an address window of a device controller that communicates with an initiator over a bus, wherein the device controller accesses requests transmitted to one address in the address window on the bus, and configures a maximum number of outstanding read requests the initiator is capable of having to memory addresses in the address window based on a size of the address window.

42 Claims, 13 Drawing Sheets

| Read Request form External Bus Master | | Order Received by Disk Controller | How Processed |
|---|---|---|---|
| Request 1 | Address = 0x10000<br>Byte Count = 1Kb | 4th received split read request | Addresses the base address of the address window. This is the 1st request processed even though the last of four received. No request processed until this 1st request is processed. |
| Request 2 | Address = 0x10400<br>Byte Count = 1Kb | 3rd received split read request | This is the 3rd request received, but is only processed after the 1st request is processed, which is (0x10000 + 1Kb = 0x10400). |
| Request 3 | Address = 0x10800<br>Byte Count = 1Kb | 2nd received split read request | This is the 2nd request received, but is only processed after the 2nd request is processed, which is (0x10400 + 1Kb = 0x10800). |
| Request 4 | Address = 0x10C00<br>Byte Count = 1Kb | 1st received split read request | This is the 1st request received, but is only processed after the 3rd request is processed, which is (0x10800 + 1Kb = 0x10C00). |

METHOD, SYSTEM, AND PROGRAM FOR CONFIGURING COMPONENTS ON A BUS FOR INPUT/OUTPUT OPERATIONS

BACKGROUND OF THE INVENTION

1. Field of the Invention

The present invention relates to a system, method, and program for configuring components on a bus for input/output operations.

2. Description of the Related Art

FIG. 1 illustrates a prior art storage device architecture, where an external bus master 2, such as a network adaptor (e.g., a Fibre Channel controller, Ethernet controller, etc.) may access data in one or more disks 4, 6 through a Serial Advanced Technology Attachment (SATA) controller 8 over a Peripheral Component Interconnect (PCI) bus 10, which may utilize the Peripheral Component Interconnect (PCI) or PCI-X protocol. In prior art systems, data being transferred between the external bus master 2 and SATA controller 8 first typically flows through a memory controller 12 and memory 14, such as a Static Dynamic Random Access Memory (SDRAM). For instance, when the external bus master 2 wants to write data to the disks 4, 6, the external bus master 2 may transfer the data to the memory 14. The SATA controller 8 may then read the data sent to the memory 14 in the write request and write the data to disk 4, 6. For a read operation, the SATA controller 8 typically transfers requested read data to the memory 14 and the external bus master 2 typically accesses the read data from the memory 14. The controllers 2 and 8 may include Direct Memory Access (DMA) engines that perform the actual data movement operations therebetween through the memory 14.

Further, in the PCI-X prior art, the memory buffer 14 enables read and write bursts between an external bus master 2 and a SATA controller 8, because current SATA controllers must operate as a bus master to handle burst data transfers. Further details of the PCI and PCI-X protocol are described in the publications "PCI Local Bus Specification", Rev. 2.3 (PCI Special Interest Group, March 2002) and "PCI-X Addendum to the PCI Local Bus Specification", Rev. 1.0a (PCI Special Interest Group, July 2000).

Using the memory 14 component to buffer data being transferred between the controllers 2 and 8 provides additional latency and delays because of the additional read and write operations involved in using the memory 14 as an intermediary buffer. For these reasons, there is a need in the art for improved techniques for transferring data between controllers in a bus architecture.

BRIEF DESCRIPTION OF THE DRAWINGS

Referring now to the drawings in which like reference numbers represent corresponding parts throughout:

FIG. 14 illustrates an example of how read requests are processed in accordance with embodiments of the invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
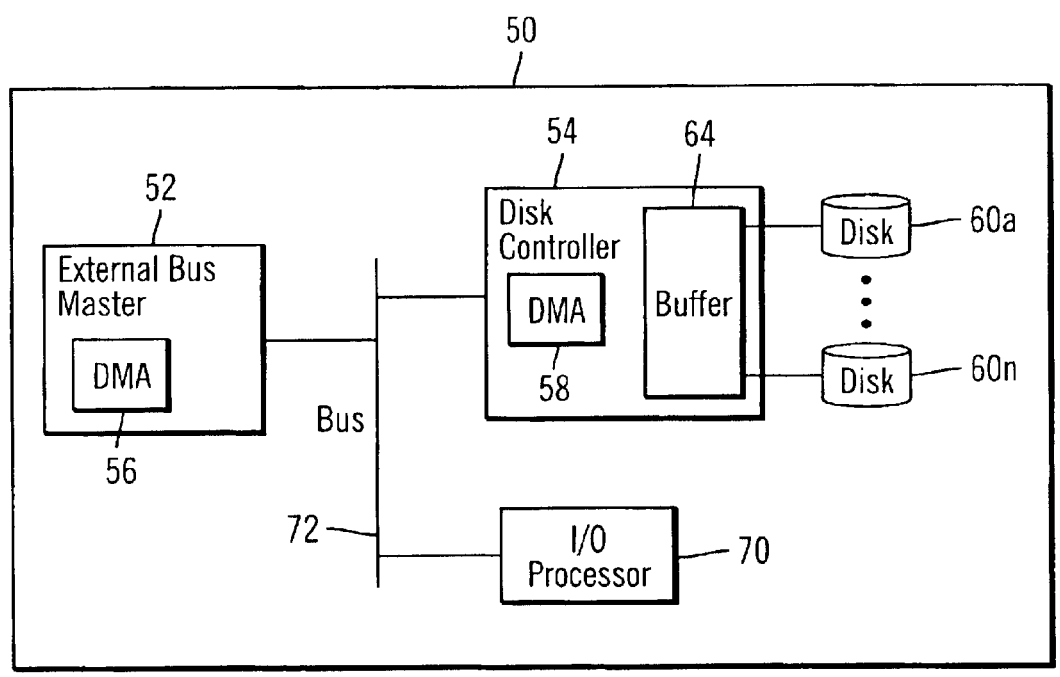
FIG. 2 illustrates a bus architecture for accessing data in storage devices in accordance with embodiments of the invention.

Transferring Data Requests Directly Between an External Bus Master and a Disk Controller FIG. 2 illustrates a computing environment in which aspects of the invention are implemented. A storage system 50, such as a disk array, (e.g., Just a Bunch of Disks (JBOD), Redundant Array of Independent Disks (RAID) array, etc.) includes an external bus master 52, which is an external bus master capable of initiating memory requests to a disk controller 54 that manages access to the disks 60a . . . 60n. External bus master 52 may include a Direct Memory Access (DMA) engine 56. Disk controller 54 includes a Direct Memory Access (DMA) engine 58 to handle I/O operations for the controller 54. The disk controller 54 may implement a disk access protocol, such as SATA, ATA, Small Computer System Interface (SCSI), Integrated Drive Electronics (IDE), etc. The disk controller 54 enables access to one or more disk drives 60a . . . 60n. The disk controller 54 includes a buffer 64 in which data read from the disks 60a . . . 60n and write data being transferred to the disks 60a . . . 60n is buffered before being transferred to the initiator. The disk controller 54 may include a component, such as a serial engine in embodiments where the disk controller 54 comprises a SATA controller, to write data in the buffer 64 to the disks 60a . . . 60n. The external bus master 52 may comprise a network adaptor that receives I/O requests from devices over a network directed to the disks 60a . . . 60n.

An I/O processor 70, such as the Intel Corporation (Intel®) IQ80310 processor, manages system operations and programs the I/O controller DMA engine 56 to read and write data at a specified address and perform other I/O management related operations. In certain embodiments, the I/O processor 70 connects to a PCI bus 72 that enables communication among the external bus master 52, disk controller 54, and I/O processor 70 to execute an I/O command received from the host processor. The external bus master 52, disk controller 54, and I/O processor 70 may be implemented on one or more PCI add-on cards that communicate over the bus 72. For instance, the I/O processor 70 and disk controller 54 may be implemented on a same PCI card and the external bus master 52 may be implemented on a different PCI card, such as a network adaptor card. The bus 72 may conform to the PCI or PCI-X protocols or any other communication protocol known in the art. Further details of the PCI-X protocol are described in the publication "PCI-X Specification Rev. 1.0a", published by PCISIG.

In embodiments where the external bus master 52 comprises a network adaptor card, such as a Fibre Channel adaptor, the I/O processor 70 may receive the I/O command through the adaptor, and then configure the external bus master 52 and disk controller 54 to transfer data as described below.

In certain embodiments, the disk controller 54 is configured to have an address window which comprises a range of addresses that may be randomly accessed and used to transfer data directly between the external bus master 52 and the disk controller buffer 64. The address window is a range of addresses that when requested cause the disk controller 54 to claim access to the request on the bus 72 and respond to the external bus master 52 request directly. The external bus master DMA 56 may utilize addresses from the address window randomly or in sequential order. The external bus master DMA 56 may thus push and pull data from the disk by accessing a memory space in the address window. Further, for any request, the DMA 56 may use any address in the window to transmit the request to the disk controller 54. The DMA engine 56 in the external bus master 52 may be configured by the I/O processor 70 to interface directly with the disk controller 54 using addresses in the address window.

Figure 3:
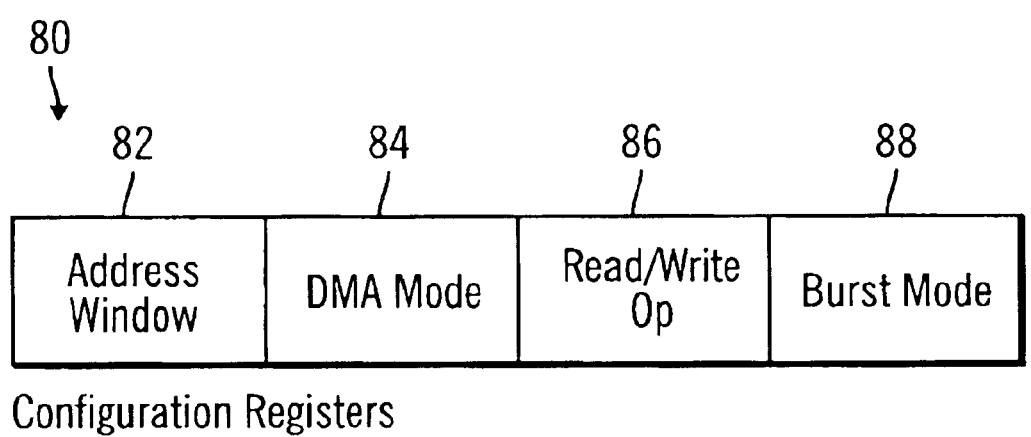
FIG. 3 illustrates configuration registers of a disk controller in accordance with embodiments of the invention.

FIG. 3 illustrates disk controller 52 configuration registers 80 to which the the I/O processor 70 writes to configure the bus 72 for I/O operations. The settings that may be written by the I/O processor in the configuration registers 80 comprise:

- address window 82: a range of addresses that an initiator, such as the external bus master 52 may use to communicate directly with the disk controller 54 and buffer 64 therein.
- DMA Mode 84: indicates whether the DMA engine is used for the I/O operations.
- Read/Write Operation (OP) 86: indicates whether the received requests are to be processed as read or write operations to the disks 60a . . . 60n.
- Burst Slave Mode 88: Indicates whether the initiator will operate in burst slave mode, enabling the disk controller to respond to burst memory requests from the external bus master 52.

Figure 4:
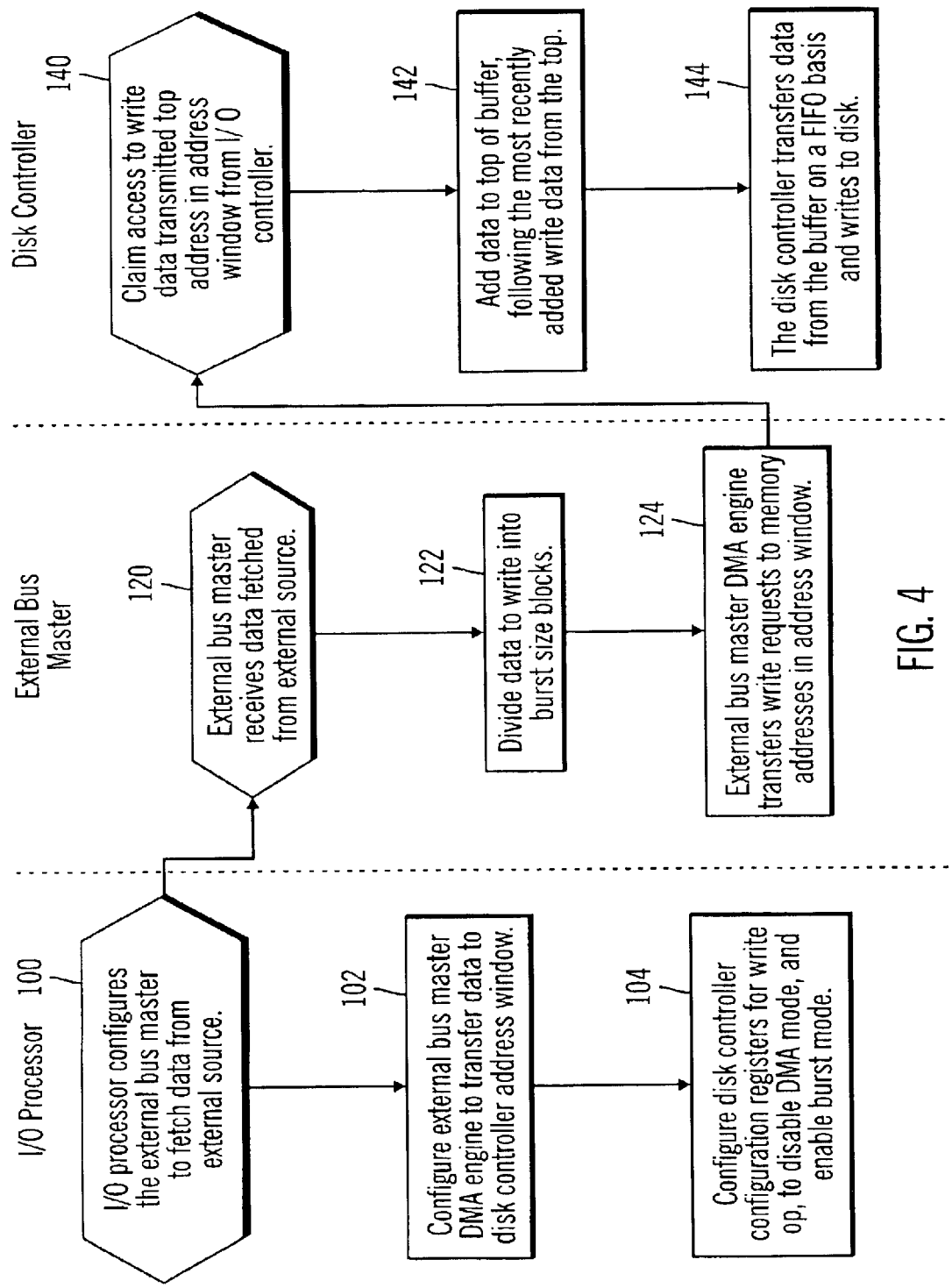
FIGS. 4 and 5 illustrate logic for handling I/O requests in accordance with embodiments of the invention.

FIG. 4 illustrates interactive operations implemented among the external bus master 52, disk controller 54, and I/O processor 70 to write data to the disks 60a . . . 60n in accordance with embodiments of the invention. Blocks 100 and 102 may be executed by the I/O processor 70. At block 100, the I/O processor 70 programs the external bus master 52 to fetch data from an external source. For instance, in embodiments where the I/O processor 70 comprises a host bus adaptor, the external source may comprise an external host submitting I/O write requests directed to the disks 60a . . . 60n. The I/O processor 70 further programs (at block 102) the external bus master DMA engine 56 to transfer the fetched data in burst sized packets to addresses in the address window of the disk controller 54 on the bus 72. The I/O processor 70 programs (at block 104) the disk controller 54 configuration registers 80 to disable DMA mode 84 in the disk controller 54, and enable burst mode by setting field 88.

In response to being configured (at blocks 100 and 102), the external bus master 52 may receive (at block 120) data fetched from the external source. Blocks 120–124 illustrate operations, or logic, implemented by the external bus master 52 when configured by the I/O processor 70. The external bus master 52 then divides (at block 122) the data to write into burst size blocks to transfer to addresses in the disk controller 54 address window over the bus 72. The DMA engine 56 then transfers (at block 124) write requests including the smaller blocks of fetched data to an address in the address window. In certain embodiments, such as PCI-X embodiments, the DMA engine 56 transfers data in burst mode (utilizing memory requests) to allow for the transfer of greater amounts of data.

Blocks 140–144 illustrate operations performed by the disk controller 54 to handle write operations to the address window to the disks 60a . . . 60n. At block 140, the disk controller 54 claims access over the write requests transmitted over the bus 72 to an address in the address window. Because the DMA mode 84 is disabled and write is indicated in the operation field 86, the disk controller 54 (at block 142) adds the received data to the buffer 64 according to the buffering scheme, which may be First-In-First-Out (FIFO). The disk controller 54 then transfers (at block 144) buffered data to the target disk 60a . . . 60n. As discussed, the disk controller 54 may include a serial engine to transfer write data in the buffer 64 to the disks 60a . . . 60n.

Figure 5:
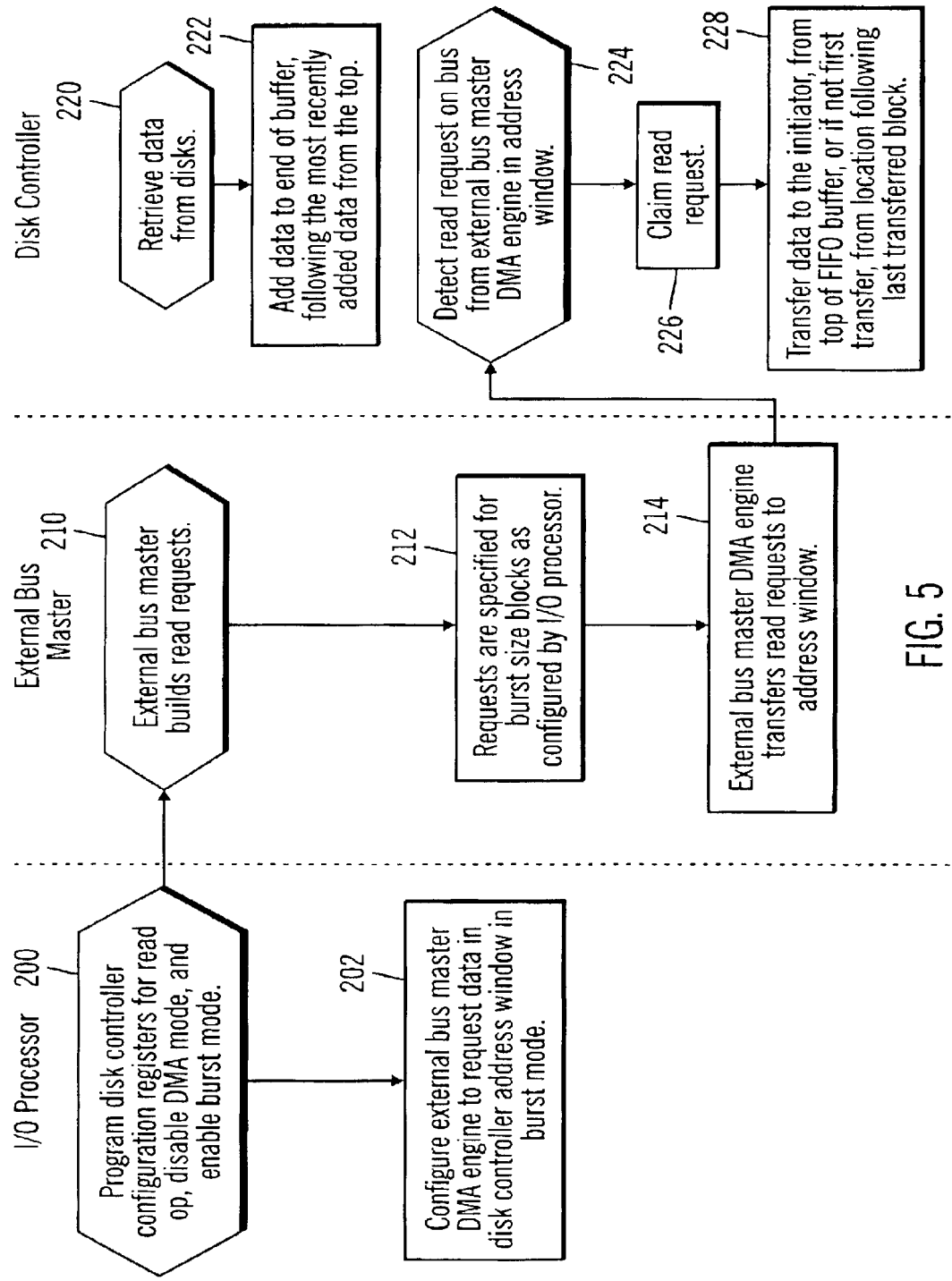

FIG. 5 illustrates operations performed by the external bus master 52, disk controller 54, and I/O processor 70 to transfer data from the disks 60a . . . 60n to the external bus master 52 in accordance with embodiments of the invention. Blocks 200 and 202 illustrate operations performed by the I/O processor 70 to configure the storage system 50 for a read operation, which may be initiated by an external host system and transmitted over a network to the external bus master 52, comprising a host bus adaptor. At block 200, the I/O processor 70 configures the disk controller 54 configuration registers 80 to disable DMA mode in field 84, and enable burst mode in field 88. The I/O processor 70 further configures (at block 202) the external bus master 52 DMA engine 56 to request a specified amount of data in the disk controller 54 address window. In PCI-X embodiments, the I/O processor 70 may configure the external bus master 52 to issue burst read requests, where each request comprises an address in the address window and a byte count of data to read, e.g., 512 bytes. The address window comprises a non-prefetchable region, since data is destroyed (replaced with new data from disks 60a, 60b . . . 60n) once it has been read from buffer 64 of the disk controller 54.

Blocks 210, 212, and 214 illustrate operations performed by the external bus master DMA engine 56 to submit the read requests. At blocks 210 and 212, the DMA engine 56 constructs read requests having burst block sizes as set by the I/O processor 70 to addresses in the address window of the disk controller 54. The DMA engine 56 then transfers (at block 214) the read requests to the address window along with the byte count of the transfer length.

Blocks 220, 222, 224, 226, and 228 illustrate operations performed by the disk controller 54 to process the burst read request. At block 220, the disk controller 54 retrieves the data from the target disk 60a . . . 60n and adds (at block 222) the data to the end of the buffer 64, following the most recently added data in FIFO embodiments. Independently of buffering the data from the disk 60a . . . 60n, the disk controller 54 may detect (at block 224) a request to an address in the address window 82 on the bus 72 and claim (at block 226) the request. In response to the read request, the disk controller 54 may transfer (at block 228) data at the top of the buffer 64, i.e., the oldest data in the buffer, to the bus to return to the initiator of the transaction, i.e., the external bus master 52. In certain embodiments, the first in data is transferred from the buffer 64 regardless of the actual address in the address window used. Further, in non-prefetchable embodiments, once data is accessed from the buffer 64, then the data is overwritten when the next data from the disks 60a . . . 60n is accessed.

Figure 1:
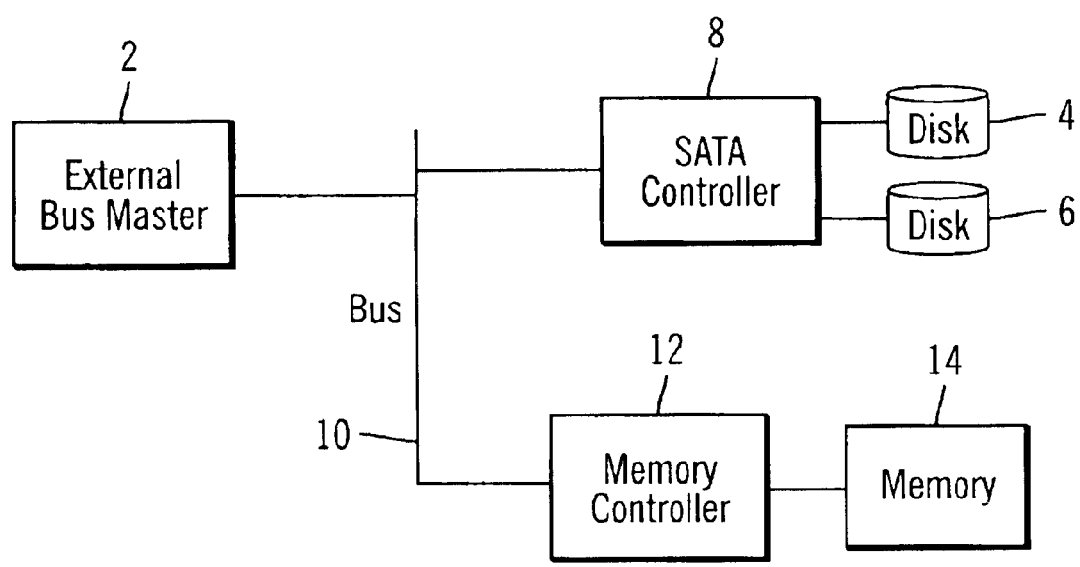
FIG. 1 illustrates a bus architecture for accessing data in storage devices as known in the prior art.

The described embodiments thus provide a technique to allow an initiator, such as the external bus master 52, to communicate burst data requests to a predefined address window in the disk controller 54 to cause the disk controller 54 to act as a slave and transfer write data to a target disk 60a . . . 60n or return read data from the buffer 64. With the described embodiments, an external bus master may communicate directly with a disk controller, such as an ATA or SATA controller, without the need for an intermediate memory device, such as shown in FIG. 1. Further, the described embodiments, allow an external bus master to burst data directly to and from a disk controller, such as an ATA controller, where the disk controller operates in burst slave mode. In this way, the described embodiments substantially reduce the latency and processor cycles needed to process I/O commands. Additionally, data that is sequentially accessed (e.g. data streaming from a disk drive) can be mapped to randomly accessed space (memory space).

Configuring the Address Window for Data Transfer Operations

In embodiments where the system 50 implements the PCI-X protocol, read requests may be transferred as a split read request. In a split read request, the external bus master 52 embodiment, acting as a bus master, transmit a read request to a memory address in the address window of the disk controller 54, which acts as a bus slave in receiving the request. When the requested data is available, the disk controller 54 embodiment then operate as a bus master and return the requested data to the external bus master 52 over the bus 72. The split read request conserves bus bandwidth because the external bus master 52 initially requesting the data does not have to continually request the read data from the disk controller 54 until the data is available, as is the case with a delayed read transaction in the PCI protocol.

The size of an I/O request to the disk controller 54 is limited to the size of the memory space allocated to the disk controller 54. For instance, if the memory space or address window for the disk controller 54 is one megabyte (Mbyte), then at most the maximum byte size of an I/O request to the disk controller 54 embodiment be one megabyte. In described embodiments, the address window may be configured independently of the size of any I/O request executed by the disk controller 54.

Figure 6:
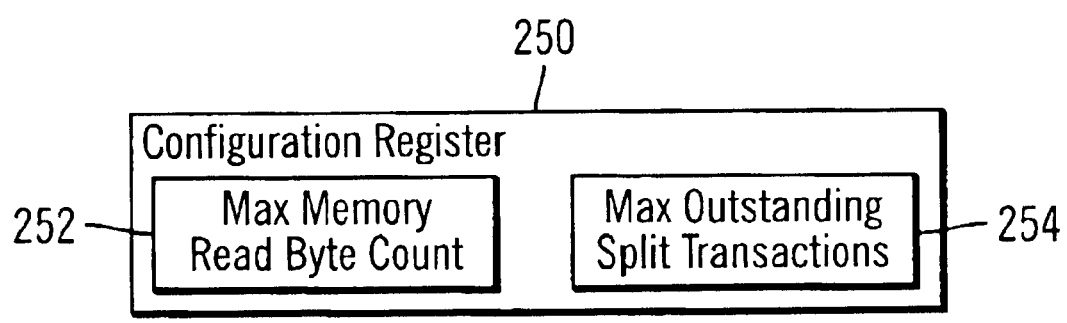
FIG. 6 illustrates registers that are configured in accordance with embodiments of the invention.

FIG. 6 illustrates a configuration register 250 included in the external bus master 52 that includes a maximum memory read byte count field 252 indicating the maximum byte size of any split read request that is outstanding and a maximum outstanding split transactions field 254 indicating the maximum number of outstanding split read requests at the external bus master 52. Thus, the maximum amount of address space that the external bus master 52 can address when all requests are outstanding (not yet completed), referred to herein as the "maximum assignable address space", comprises the multiplication of the values in fields 252 and 254.

In certain embodiments, the maximum number of outstanding split read requests that can be directed to the address window of the disk controller 54 is the size of the address window divided by the maximum split read request size. Limiting the outstanding requested byte count to the size of the address window ensures that multiple outstanding split read requests will not be directed to the same memory address in the address window. If multiple outstanding split read requests are directed to the same memory address, then the external bus master 52 embodiment not be able to match returned data to the particular request.

The address window defined for the memory of the disk controller 54, in current embodiments, can extend up to a couple of gigabytes. However, the system 50 designer may want to set the address window to some smaller amount depending on the characteristics of the disk controller 54 and system 50 in which the disk controller 54 will operate. In certain embodiments, the maximum outstanding split transactions field 254 is configured based on the size of the address window, such that the maximum outstanding split transactions field 254 is set to the size of the address window (which may be configured independently of any considerations of the split read capabilities of the external bus master 52) divided by the maximum memory read byte count field 252. In this way, the maximum outstanding split read requests from the external bus master 52 will not use, at any given time, any more addresses than provided in the disk controller 54. This ensures that no one memory address in the address window will be used in concurrent multiple outstanding split read requests. In other words, the external bus master 52 will not re-use a previously used address until the previous request to the re-used address is complete. Otherwise, if the disk controller 52 received multiple split read requests using the same memory address in the address window, then the disk controller 54 embodiment not be able to determine the order in which the external bus master 52 initiated the split read requests.

Figure 7:
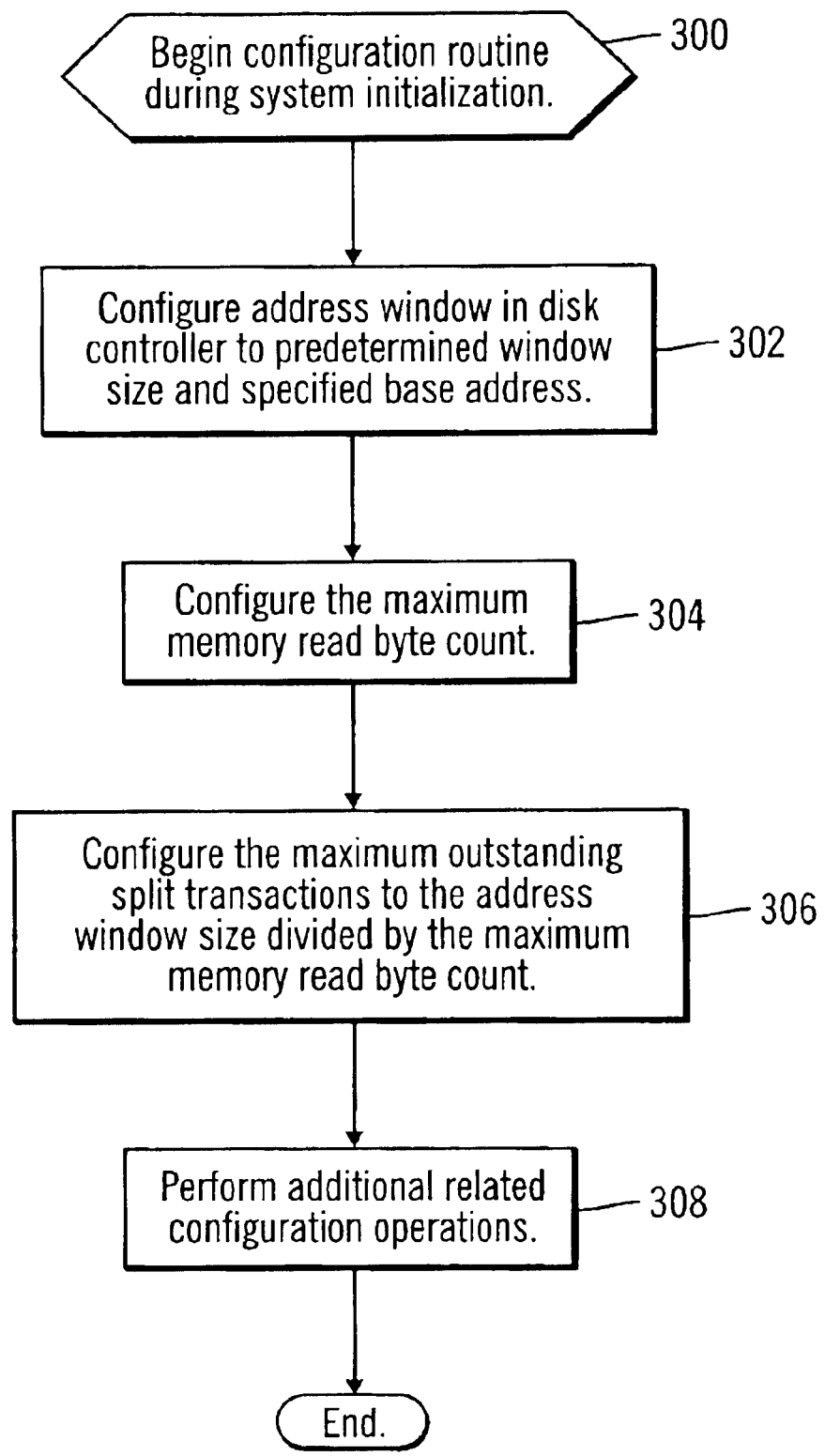
FIG. 7 illustrates logic to configure a device controller in accordance with embodiments of the invention.

FIG. 7 illustrates logic implemented in the I/O processor 70 to configure the external bus master 52 PCI registers during initialization, such as system startup or reboot. Upon beginning the configuration routine (at block 300), the I/O processor 70 configures (at block 302) the address window for the disk controller 54 to a predetermined optimal size for operations directed to the controller 54. The address window may be configured in the PCI-X configuration registers of the disk controller 54. The maximum memory read byte count 252 register in the external bus master 52 is set (at block 304) to a predetermined value, which is the maximum size of a submitted split read request. The maximum outstanding split transactions 254 is set (at block 306) to the integer result of the address window byte size divided by the maximum memory read byte count 252. If the result of the division is not an integer, then the maximum outstanding split transactions 264 embodiment comprise the integer portion of the division result. The I/O processor 70 can then perform additional (at block 308) configuration operations. After configuring the address window and external bus master registers 250 (FIG. 6), the address window to the disk controller 54 is setup to allow data to be directly transferred between an external bus master 52 without going through an external memory device on the bus 72.

Figure 8:
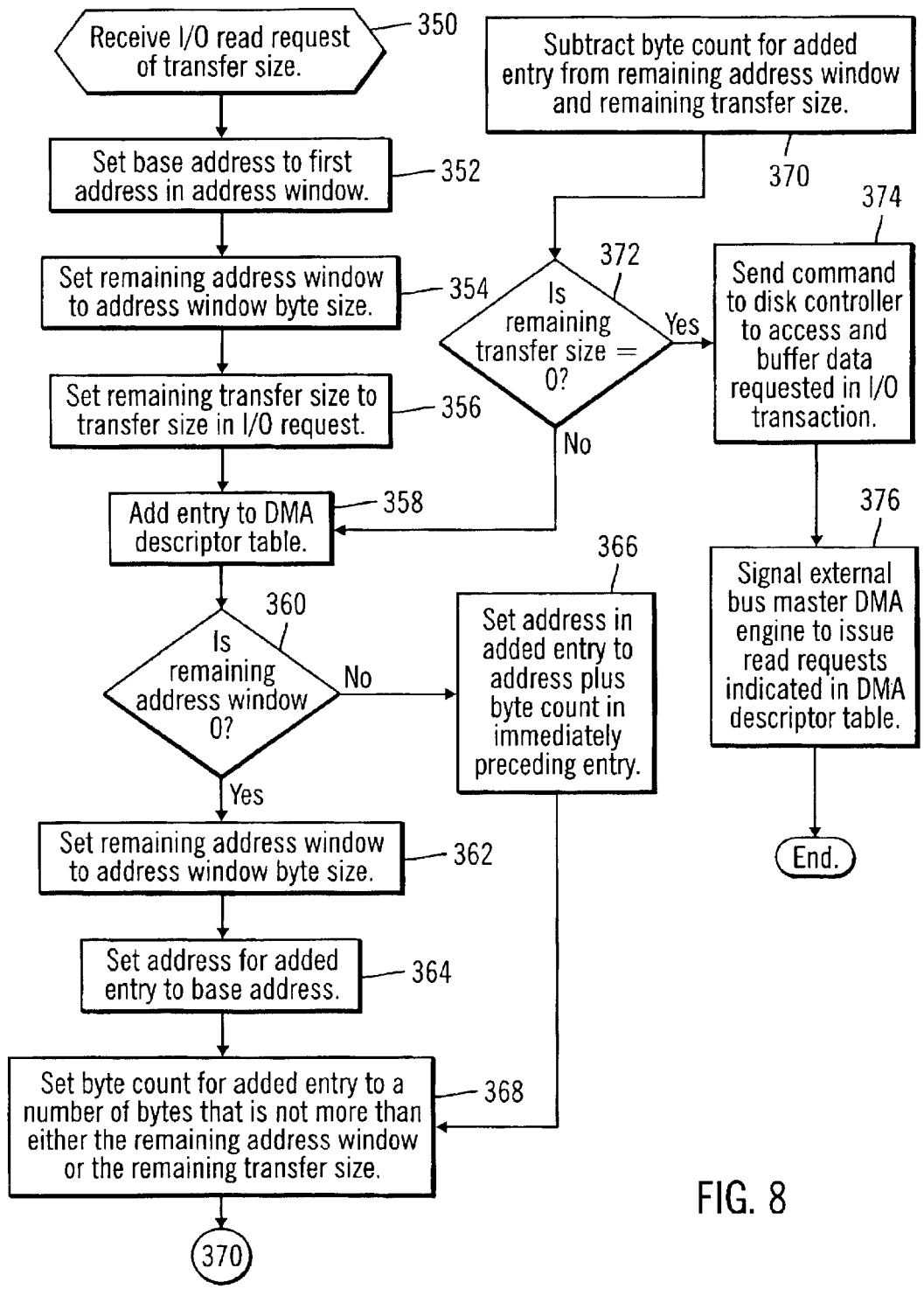
FIG. 8 illustrates logic to configure an external bus master in accordance with embodiments of the invention.
Figure 9:
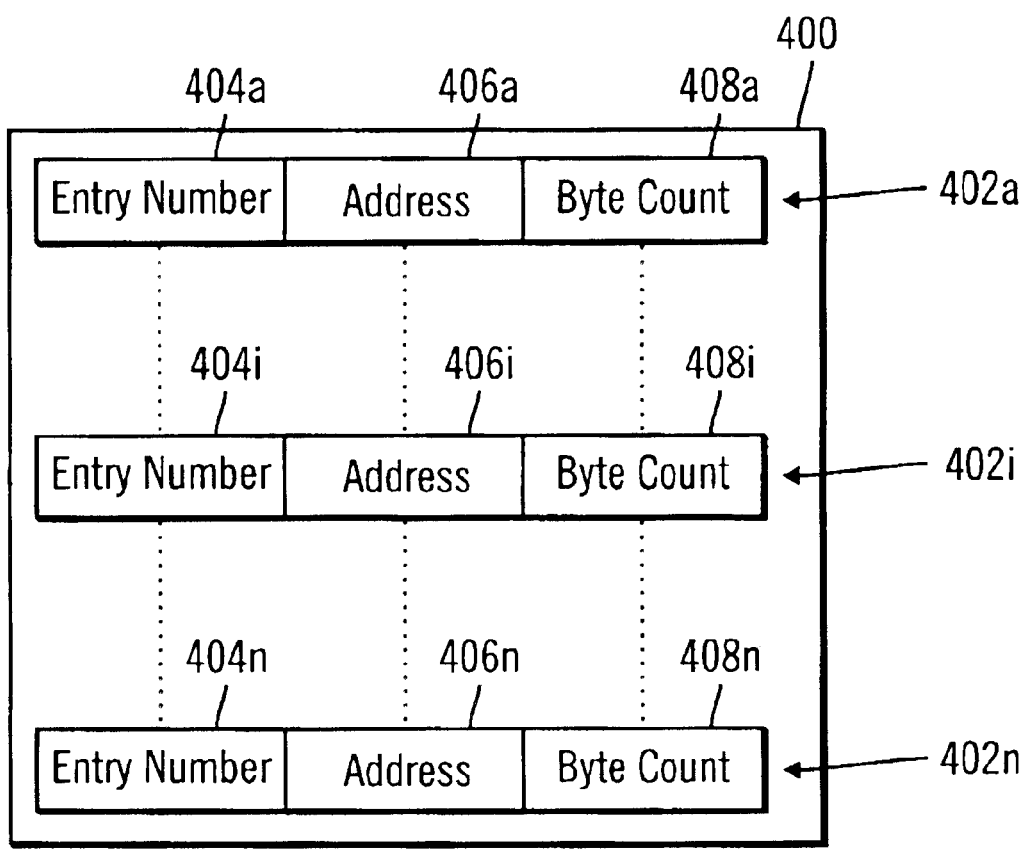
FIG. 9 illustrates a Direct Memory Access (DMA) descriptor table utilized with embodiments of the invention.

FIG. 8 illustrates logic implemented in the I/O processor 70 to configure the external bus master 52 and the disk controller 54 to handle a read request submitted to the external bus master 52. Upon receiving (at block 350) an I/O request having a transfer size, the I/O processor 70 sets (at block 352) a base address to the first address in the address window and sets (at block 354) the remaining address window to the address window byte size. A remaining transfer size variable is set (at block 356) to the transfer size of the received I/O request. The I/O processor 70 then adds (at block 358) a descriptor entry in a descriptor table that defines the operations the external bus master DMA 56 performs. FIG. 9 illustrates a DMA descriptor table 400 as having a plurality of entries 402a . . . 402n, where each entry includes an entry number 404a . . . 404n, an address 406a . . . 406n of the memory address to which the request is directed, and a byte count 408a . . . 408n indicating the number of bytes involved in the request to the memory address 406a . . . 406n. Entries are added to a list to be processed on a First-In-First-Out (FIFO) basis. If (at block 360) the remaining address window size is zero, indicating that all addresses in the window were used in the previous descriptor entries, then the remaining address window is set (at block 362) to the address window byte size. The address 406n for the added entry 402n is set (at block 364) to the base address. If (at block 360) the remaining address window is not zero, then the I/O processor 70 sets (at block 366) the address 406n in the added entry 402n to the address plus the byte count in the immediately preceding entry $402_{n-1}$.

From block 364 or 366, the I/O processor 70 sets (at block 368) the byte count 408n for the added entry 402n to a number of bytes that is not more than either the remaining address window or the remaining transfer size. The byte count 408n for the added entry 402n is then subtracted (at block 370) from both the remaining address window and remaining transfer size. If (at block 372) the remaining transfer size is zero, i.e., there are no further bytes in the received I/O request that need to be read, then the I/O processor 70 sends (at block 374) a command to the disk controller 54 to access from disk 60a . . . 60n and store in buffer 564 the data requested in the I/O transaction. The I/O processor 70 also signals (at block 376) the external bus master DMA 56 to issue read requests for the entries added to the DMA descriptor table 400 to access the data that will be gathered by the disk controller 54 and stored in the buffer 64 (FIG. 2). If (at block 372) the remaining transfer size is greater than zero, i.e., there are further bytes in the received I/O request that must be processed, then control proceeds to block 358 to add another entry to the descriptor table.

With the logic of FIG. 8, the entries indicated in the descriptor table 400 can be of different byte count sizes. In certain embodiments, the I/O processor 70 can configure the external bus master 52 read request size to a value (such as 512 bytes) that is independent of the byte count size 408a, 408i . . . 408n in the descriptor table entries 402a, 402i . . . 402n. In certain of the embodiments, the byte count 408a, 408i . . . 408n of the entry may not exceed the size of the address window. In such embodiments, the address window of the disk controller 54 must be set to a size that is capable of accommodating the maximum number of outstanding read requests 254 (FIG. 6), each having at most a byte count size equal to the maximum read byte count 252 configured for split read requests. For instance, if the maximum outstanding requests 254 is four and the maximum read byte count 252 is one kilobyte (kb), then the address window must be at least four kilobytes in size. Each descriptor entry 402a, 402i . . . 402n, however, can have a byte count of four kilobytes, the address window size. In such cases, the external bus master 52, when processing a descriptor entry 402a . . . 402n defining a request having a byte count 408a . . . 408n that is greater than the maximum read byte count 252, will divide the descriptor request, which in the example is four kilobytes, into requests that do not exceed the maximum read byte count 252, e.g., one kilobyte. In this way, the byte count 408a . . . 408n (FIG. 9) indicated in the descriptor entries 402a . . . 402n are independent of the maximum read byte count 252, and is instead limited by the size of the address window. Thus, in such embodiments, the byte count 408a . . . 408n of a descriptor entry 402a . . . 402n cannot exceed the limit of the address window.

Figure 10:
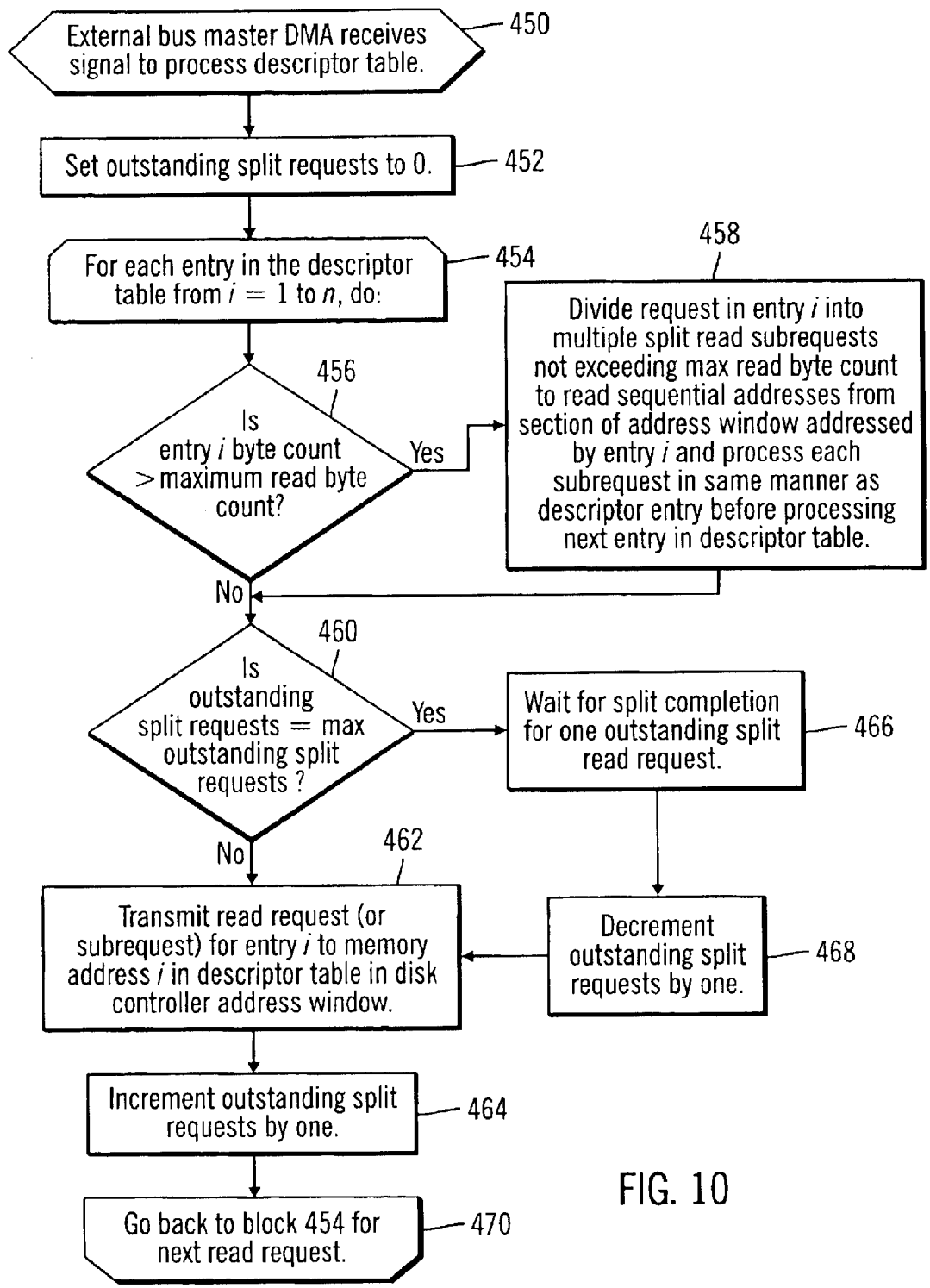
FIG. 10 illustrates logic to process a DMA descriptor table in accordance with embodiments of the invention.

FIG. 10 illustrates logic implemented in the DMA engine 56 to process the DMA descriptor table 400 generated by the I/O processor 70 according to the logic of FIG. 8. In response (at block 450) to the signal from the I/O processor 70 to commence operations, the DMA 56 sets (at block 452) the number of outstanding split requests variable to zero. The DMA 56 then performs a loop from blocks 454 to 470 for each entry i in the DMA descriptor table 400, where i equals one to n. If (at block 456) the byte count 408i for entry i exceeds the maximum read byte count 252 (FIG. 6), then the DMA engine 56 divides (at block 458) the request in entry i into multiple split read subrequests each not exceeding the maximum read byte count 252 to read sequential addresses from the section of the address window accessed by the request for entry i. Each of the subrequests is processed in the same manner as sequential descriptor entries before processing the next entry in the descriptor table 400.

From the no branch of block 456 or block 458, if (at block 460) the number of outstanding split requests does not exceed the maximum outstanding split transactions 254 indicated in the configuration registers 250, i.e., more split read requests may be issued, then the DMA 56 transmits (at block 462) the read request or one of the subrequests for entry 402i to the memory address 406i provided for entry 402i. The outstanding split requests variable is incremented (at block 464) and control proceeds (at block 470) back to block 454 to process the next entry in the DMA descriptor table 400. If (at block 460) the maximum possible number of split requests are outstanding, then the DMA 56 waits (at block 466) for one split request to complete. After completing the split request, the DMA 56 decrements (at block 468) the outstanding split requests variable by one and proceeds to block 458 to transmit the next read request in the ith entry in the DMA descriptor table 400.

With the described embodiments, the address window for the disk controller 54 can be set to any size independent of the size of the I/O transaction received at the external bus master 52. Based on the configured address window, the I/O processor embodiment determine the maximum number of outstanding split read requests that the external bus master DMA 56 may submit in order to process a received I/O transaction that is larger than the address window. By setting the maximum outstanding split transactions 254 to not cause the number of bytes of the outstanding split requests to exceed the number of bytes in the address window, which embodiment require reusing addresses in the address window, the I/O processor 70 ensures that the disk controller 54 can determine the order in which requests were initiated and return requested data to the correct request. In this way, the external bus master 52 is certain of the read request associated with data returned from the disk controller 54.

Returning Data to Read Requests

Figure 11:
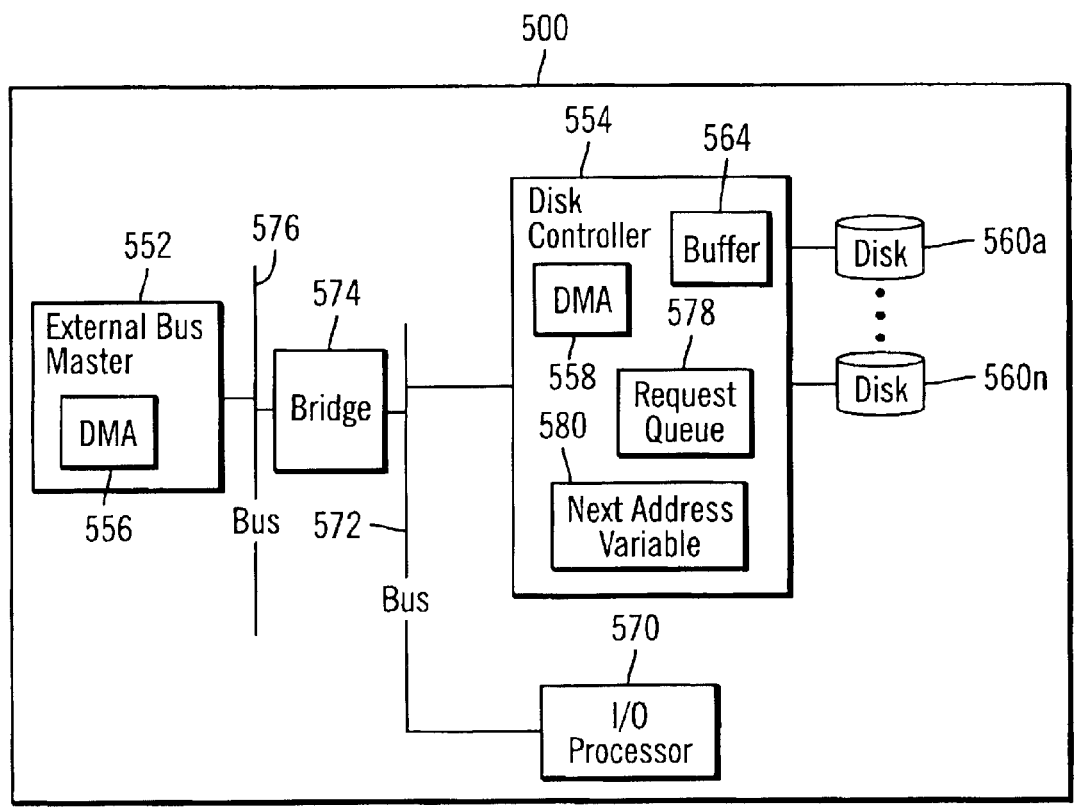
FIG. 11 illustrates an alternative bus architecture for accessing data in storage devices in accordance with embodiments of the invention.

FIG. 11 illustrates an alternative embodiment of the system 50 shown in FIG. 2, where the components 552, 554, 556, 558, 560a . . . 560n, 564, 570, and 572 in the system 550 in FIG. 11 may comprise the same components 52, 54, 56, 58, 60a . . . 60n, 64, 70, and 72 shown in FIG. 2. In addition, the system 500 in FIG. 11 includes a bridge 574 between the external bus master 552 and the bus 572 connecting to the disk controller 554. Another bus 576 connects the external bus master 552 to the bridge 574. In PCI and PCI-X embodiments, a bridge, such as bridge 574, may forward read requests, such as split read requests, out of order with respect to the order in which they were made by the original initiator, e.g., external bus master 552. This may result in the bridge 574 forwarding a later sent read request before an earlier sent request.

In the above described embodiments, the disk controller 554 returns data from the buffer 564 that was read from the disk 560a . . . 560n in response to a request to an address in the address window. If the external bus master 552 requests sequential data from sequential addresses in the address window, then the external bus master 552 expects the data to be returned to the sequential requests in the order in which the requests were generated. However, if the disk controller 554 returns data from the buffer 564 to a request to an address that follows a request to a previous address that has not been processed, then the disk controller 554 may return the data out of order. For instance, PCI and PCI-X bridges may forward requests out of order. In such case, if the disk controller 554 responds to a read request received out of the sequential order in which the requests were issued, then the disk controller 554 may return data out of order such that data may be returned to a subsequent request when the data should have been returned to a previously issued request not yet received.

In certain described embodiments, the disk controller 554 returns data to requests from the external bus master 552 according to the order in which the requests were initiated by the external bus master DMA 556 regardless of whether the requests are received out of their sequential ordering. In this way, data is returned sequentially to the requests in the order in which the requests were issued, such that each transmitted request will access a sequential portion of the data requested from disk 560a . . . 560n. To return sequential data to the requests in the order in which the requests were initiated by the external bus master 552, the disk controller 554 maintains a request queue 578 to buffer read requests, such as split read requests, from the external bus master 552 received out of order. The disk controller 554 further maintains a next address variable 580 indicating the address of the next request that should be received that sequentially follows the previously processed request. In the described embodiments, the external bus master 552 issues requests sequentially to addresses in the address window, such that a subsequent request should be directed to the address that immediately follows the target address plus the byte count of the previous request. In certain embodiments, the request queue 578 may be of sufficient size to queue the maximum number of read requests that may be outstanding at once from the external bus master 554, which may comprise the maximum outstanding split transactions 254 (FIG. 6) setting for the external bus master 552.

Figure 12:
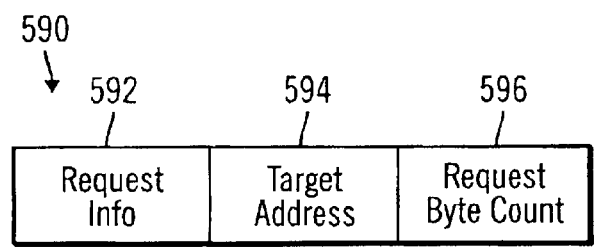
FIG. 12 illustrates fields in a request that are queued during read request processing in accordance with embodiments of the invention.

The request queue 578 may include information provided with each read request transmitted from the external bus master 552. FIG. 12 illustrates information maintained with each request entry 590 in the request queue 578, where each entry 590 may include request information 592 to identify the request, the target address of the request 594 within the address window for the target device, e.g., disks 560a . . . 560n, and a byte count 596 of the request.

In certain embodiments, every read request may specify the same request byte size. In alternative embodiments, each read request may specify a different byte size when accessing contiguous addresses in the address window. In certain embodiments, the read requests may comprise read requests, such as split read requests, sent from the external bus master DMA 556 when processing a descriptor table generated by the I/O processor 570 according to the logic of FIG. 8.

Figure 13:
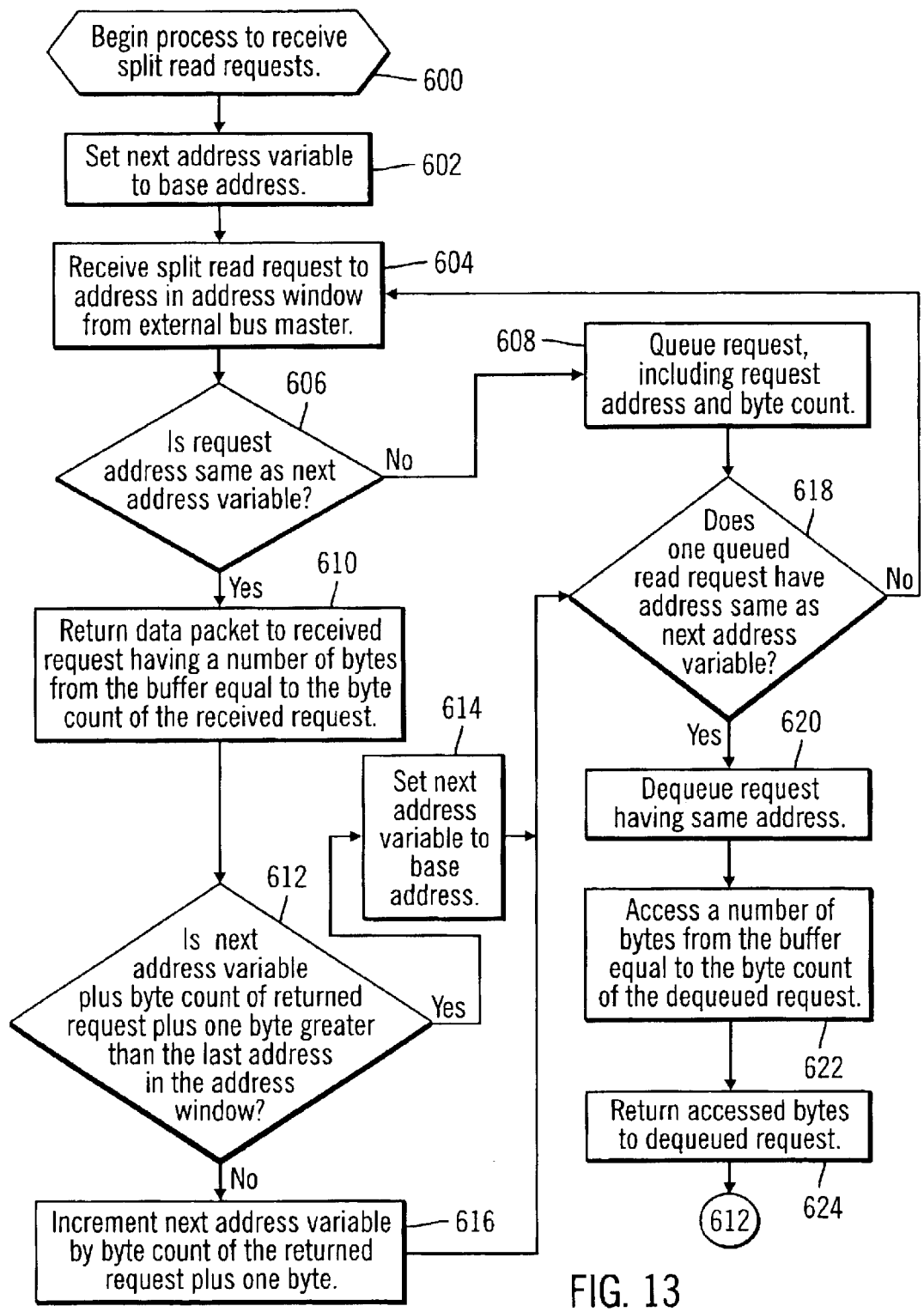
FIG. 13 illustrates logic to return data to read requests in accordance with embodiments of the invention.

FIG. 13 illustrates logic implemented in the disk controller 554 to return data to split read requests. Control begins with the disk controller receiving (at block 600) indication that split read requests will be received. This indication may comprise the I/O processor 570 sending the command to buffer and access data for an I/O request, such as the signal the I/O processor 570 sends at block 374 in FIG. 8. The disk controller 554 sets (at block 602) a next address variable 580 indicating the address for the expected next sequential split read request to the base, or first, address in the disk controller 554 address window. Upon receiving (at block 604) a split read request to an address in the address window from the external bus master 552, the disk controller 554 determines (at block 606) whether the received request is to an address that is the same address indicated in the next address variable 580. If not, then the disk controller 554 queues (at block 608) the received split read request in the request queue 578, where the queued request 590 may include the request information 592, the target address 594, and the byte count 596 of the request. If (at block 606) the target address of the received request is the same as the address indicated in the next address variable 580, then the disk controller 554 returns (at block 610) a data packet (if currently available in the buffer 564) to the received request having a number of bytes from the buffer 564 equal to the byte count indicated in the received split read request. In certain embodiments, the buffer 564 queues data accessed from the disks 560a . . . 560n on a FIFO basis, such that the data returned is accessed from the "first-in" end of the buffer 564.

After returning the data, if (at block 612) the next address variable 580 plus the byte count of the returned request is equal to the last address in the address window, i.e., there are no more sequential address remaining in the address window following the last request, then the next address variable 580 is set (at block 614) to the base address because the addresses roll over to the base address. Otherwise, if there are addresses in the address window following the last request, then the disk controller 554 increments (at block 616) the next address variable 580 by the byte count of the request to which data was just returned because the next request will be directed to the next sequential address following the last address of the previously processed request.

After incrementing the next address variable 580 to the address of the next sequential read request at block 614 or 616, the disk controller 554 determines (at block 618) whether one queued read request in the request queue 578 has a same target address 594 (FIG. 12) as the next address variable 580, i.e., the address of the next expected sequential split read request that was previously received and placed in the request queue 578. If not, control returns to block 604 to wait for the next split read request. Otherwise, the disk controller 554 dequeues (at block 620) the request having the same address. When dequeuing the request having the same address (at block 620), the disk controller 554 accesses (at block 622) a number of bytes from the buffer 564 equal to the byte count of the dequeued request and returns (at block 624) the accessed bytes to the dequeued request in a manner known in the art. From block 624 control proceeds to block 612 to set the next address variable 580 to the address of the next sequential read request to process.

FIG. 14 provides a table illustrating how four sequential read requests 1, 2, 3, and 4, each one kilobyte in length and issued by the external bus master 552, are processed in accordance with the logic of FIG. 13. In the example of FIG. 14, the disk controller 554 receives requests 1, 2, 3, and 4 to sequential addresses in the address window in the reverse order in which they were initiated by the external bus master 552. As shown, data is not returned to a request until data is returned to the request to previous sequential addresses. Until data is returned to the previous request, the request is queued.

With the described embodiments, if the disk controller 554 receives split read requests out of order due to request processing by a bridge 574 or for some other reason, then the disk controller 554 will queue requests received out of order and only return data to a request that is the next expected read request. In this way, the disk controller 554 sequentially returns data to the split read requests in the order in which the split read requests were initiated by the external bus master 552. This ensures that the external bus master 552 receives data returned to the appropriate read requests, such that data is returned to sequential requests in the sequential order in which they were intended to be serviced.

Additional Embodiments

The operations and logic described herein may be implemented as a method, apparatus or article of manufacture using standard programming and/or engineering techniques to produce software, firmware, hardware, or any combination thereof. The term "article of manufacture" as used herein refers to machine readable instructions or logic implemented in hardware logic (e.g., an integrated circuit chip, Programmable Gate Array (PGA), Application Specific Integrated Circuit (ASIC), etc.) or a machine readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessible and executable by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the processing devices 52, 54, and 70 communicate on a bus topology, such as a PCI-X or PCI bus topology. In alternative implementations, the processing devices 52, 54, and 70 may communicate using any communication architecture known in the art.

In PCI bus implementations, additional PCI-X or PCI bridges may be located between any of the processing devices 52, 54, and 70 and the bus 72 to enable communication on the bus 72. For instance, in PCI-X implementations, the external bus master 52 may transmit burst read requests to a bridge, which may then forward the request to bus 72 to fetch the exact amount of requested data.

In certain implementations, the disk drives 60a . . . 60n comprised magnetic hard disk drives. In alternative implementations, the storage devices connected to the disk controller 54 may comprise any storage device known in the art, such as optical disks, tapes, etc.

In the described implementations, the initiator uses the address window to submit requests to a disk controller. In alternative implementations, the target disk controller may comprise any type of Input/Output controller device known in the art, in addition to storage related controllers. Further, the initiator or external bus master 52 may be any device that initiates requests to the disk controller, such as a host bus adaptor or other external device.

The logic of FIGS. 4 and 5 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units. In further embodiments, the address window might be set to a smaller size to allow for address windows for multiple target devices, such as disk controllers, so that each target device may have a unique range of the address window. This allows the external bus master to directly access any of multiple target devices by sending data requests to memory addresses in the address window configured for the specific target device.

In the described embodiments, the received read requests comprised split read requests. Alternatively, the requests processed according to the logic described above may comprise any type of bus request to which data is returned.

In the above described embodiments, the disk controller maintained the address of the next sequential request issued by the external bus master that should be received to determine whether requests were received out of order. In alternative embodiments, the disk controller may perform alternative operations to determine whether at least one read request for sequential data preceding the data requested by the received read request was not processed, i.e., whether the current received request is for data that follows data requested by previous requests which have not been processed. Alternative calculations, flags and/or other indicators may be used to determine whether transmitted requests are received out of order.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
configuring an address window of a device controller that communicates with an initiator over a bus to enable the device controller to access requests transmitted to one address in the address window on the bus; and
configuring a maximum number of outstanding read requests the initiator is capable of having to memory addresses in the address window based on a size of the address window.

2. The method of claim 1, wherein configuring the maximum number of outstanding read requests the initiator is capable of having to memory addresses in the address window comprises:
configuring a maximum byte count of each read request the initiator may transmit; and
dividing a number of bytes in the address window by the maximum byte count of each read request, wherein the maximum number of outstanding read requests comprises a result of the dividing.

3. The method of claim 1, wherein the maximum number of outstanding read requests is for split read requests, wherein the device controller operates as a bus master when returning data in response to the split read requests.

4. The method of claim 1, further comprising:
- receiving an external I/O read transaction to access a target device;
- generating a number of read requests to memory addresses in the address window to implement the received I/O read transaction; and
- signaling the initiator to transmit the read requests to cause the initiator to transmit the read requests to the memory addresses, wherein a number of outstanding read requests transmitted by the initiator will not exceed the maximum number of outstanding read requests.

5. The method of claim 4, further comprising:
- receiving, by the initiator, data from the target device in response to one read request; and
- transmitting, by the initiator, one read request after receiving the data from the target device.

6. The method of claim 4, wherein the initiator includes a Direct Memory Access (DMA) controller, and wherein generating the read requests further comprises:
- generating a DMA descriptor table including one entry for each generated read request; and
- for each read request, including a memory address in the address window for the read request and a byte count of the read request.

7. The method of claim 6, wherein including the memory address comprises including:
- a memory address sequential with respect to a previous request if there is at least one byte in the address window following the memory address sequentially following the previous request; and
- a base memory address in the address window if there is not at least one byte in the address window following the memory address sequentially following the previous request.

8. The method of claim 4, wherein the read requests are transmitted in burst mode, and wherein the disk controller operates as a slave when processing the read requests transmitted in burst mode.

9. The method of claim 4, wherein each generated read request has a byte count that is less than or equal to a number of bytes in the address window.

10. The method of claim 4, wherein each read request is less than or equal to a maximum read request size, and wherein a number of bytes in the address window is at least the maximum read request size times the maximum number of outstanding read requests.

11. The method of claim 1, wherein each generated read request has a byte count that is less than or equal to a number of bytes in the address window.

12. The method of claim 11, wherein the initiator divides read requests having a byte count greater than a maximum read request size into subrequests to separately transmit.

13. The method of claim 1, wherein the address window is to a non-prefetchable region.

14. The method of claim 1, wherein the initiator comprises an external bus master and device controller comprises a disk controller executing read requests against at least one storage disk.

15. The method of claim 1, wherein the bus implements the PCI-X protocol.

16. A system, comprising:
- a bus;
- an initiator coupled to the bus;
- a target device;
- a device controller to control access to the target device, wherein the device controller is coupled to the bus; and
- a processor coupled to the bus, wherein the processor performs:
  - (a) configuring an address window of the device controller to enable the device controller to access requests transmitted to one address in the address window on the bus; and
  - (b) configuring a maximum number of outstanding read requests the initiator is capable of having to memory addresses in the address window based on a size of the address window.

17. The system of claim 16, wherein the processor further performs:
- receiving an external I/O read transaction to access the device;
- generating a number of read requests to memory addresses in the address window to implement the received I/O read transaction; and
- signaling the initiator to transmit the read requests to cause the initiator to transmit the read requests to the memory addresses of the device, wherein a number of outstanding read requests transmitted by the initiator will not exceed the maximum number of outstanding read requests.

18. The system of claim 17, wherein the initiator includes a Direct Memory Access (DMA) controller, and wherein the processor generates the read requests by:
- generating a DMA descriptor table including one entry for each generated read request; and
- for each read request, including a memory address in the address window for the read request and a byte count of the read request.

19. The system of claim 18, wherein the processor includes the memory address by including:
- a memory address sequential with respect to a previous request if there is at least one byte in the address window following the memory address sequentially following the previous request; and
- a base memory address in the address window if there is not at least one byte in the address window following the memory address sequentially following the previous request.

20. The system of claim 17, wherein the read requests are transmitted in burst mode, and wherein the disk controller operates as a slave when processing the read requests transmitted in burst mode.

21. The system of claim 17, wherein each generated read request has a byte count that is less than or equal to a number of bytes in the address window.

22. A system for handling read requests, wherein a bus enables communication with an initiator and a device controller, and wherein the device controller controls access to a device, comprising:
- a processor coupled to the bus; and
- code executed by the processor to cause the processor to perform:
  - (i) configuring an address window of a device controller that communicates with an initiator over a bus to enable the device controller to access requests transmitted to one address in the address window on the bus; and (ii) configuring a maximum number of outstanding read requests the initiator is capable of having to memory addresses in the address window based on a size of the address window.

23. The system of claim 22, wherein the code further causes the processor to perform:
receiving an external I/O read transaction to access the device;
generating a number of read requests to memory addresses in the address window to implement the received I/O read transaction; and
signaling the initiator to transmit the read requests to cause the initiator to transmit the read requests to the memory addresses of the device, wherein a number of outstanding read requests transmitted by the initiator will not exceed the maximum number of outstanding read requests.

24. The system of claim 23, wherein the initiator includes a Direct Memory Access (DMA) controller, and wherein the means for generating the read requests further performs:
generating a DMA descriptor table including one entry for each generated read request; and
for each read request, including a memory address in the address window for the read request and a byte count of the read request.

25. The system of claim 24, wherein including the memory address comprises including:
a memory address sequential with respect to a previous request if there is at least one byte in the address window following the memory address sequentially following the previous request; and
a base memory address in the address window if there is not at least one byte in the address window following the memory address sequentially following the previous request.

26. The system of claim 23, wherein the read requests are transmitted in burst mode, and wherein the disk controller operates as a slave when processing the read requests transmitted in burst mode.

27. The system of claim 23, wherein each generated read request has a byte count that is less than or equal to a number of bytes in the address window.

28. An article of manufacture capable of causing operations to be performed, wherein the operations comprise:
configuring an address window of a device controller that communicates with an initiator over a bus to enable the device controller to access requests transmitted to one address in the address window on the bus; and
configuring a maximum number of outstanding read requests the initiator is capable of having to memory addresses in the address window based on a size the address window.

29. The article of manufacture of claim 28, wherein configuring the maximum number of outstanding read requests the initiator is capable of having to memory addresses in the address window comprises:
configuring a maximum byte count of each read request the initiator may transmit; and
dividing a number of bytes in the address window by the maximum byte count of each read request, wherein the maximum number of outstanding read requests comprises a result of the dividing.

30. The article of manufacture of claim 28, wherein the maximum number of outstanding read requests is for split read requests, wherein the device controller operates as a bus master when returning data in response to the split read requests.

31. The article of manufacture of claim 28, further comprising:
receiving an external I/O read transaction to access a target device;
generating a number of read requests to memory addresses in the address window to implement the received I/O read transaction; and
signaling the initiator to transmit the read requests to cause the initiator to transmit the read requests to the memory addresses of the target device, wherein a number of outstanding read requests transmitted by the initiator will not exceed the maximum number of outstanding read requests.

32. The article of manufacture of claim 31, further comprising:
receiving, by the initiator, data from the target device in response to one read request; and
transmitting, by the initiator, one read request after receiving the data from the target device.

33. The article of manufacture of claim 31, wherein the initiator includes a Direct Memory Access (DMA) controller, and wherein generating the read requests further comprises:
generating a DMA descriptor table including one entry for each generated read request; and
for each read request, including a memory address in the address window for the read request and a byte count of the read request.

34. The article of manufacture of claim 33, wherein including the memory address comprises including:
a memory address sequential with respect to a previous request if there is at least one byte in the address window following the memory address sequentially following the previous request; and
a base memory address in the address window if there is not at least one byte in the address window following the memory address sequentially following the previous request.

35. The article of manufacture of claim 31, wherein the read requests are transmitted in burst mode, and wherein the disk controller operates as a slave when processing the read requests transmitted in burst mode.

36. The article of manufacture of claim 28, wherein each generated read request has a byte count that is less than or equal to a number of bytes in the address window.

37. The article of manufacture of claim 28, wherein each read request is less than or equal to a maximum read request size, and wherein the address window has a number of bytes that is at least the maximum read request size times the maximum number of outstanding read requests.

38. The article of manufacture of claim 28, wherein each generated read request has a byte count that is less than or equal to a number of bytes in the address window.

39. The article of manufacture of claim 38, wherein the initiator divides read requests having a byte count greater than a maximum read request size into subrequests to separately transmit.

40. The article of manufacture of claim 28, wherein the address window is to a non-prefetchable region.

41. The article of manufacture of claim 28, wherein the initiator comprises an external bus master, the device controller comprises a disk controller, and a target device comprises at least one storage disk.

42. The article of manufacture of claim 28, wherein the bus implements the PCI-X protocol.

* * * * *